(12) United States Patent
Sugihara et al.

(10) Patent No.: US 7,505,695 B2
(45) Date of Patent: Mar. 17, 2009

(54) OPTICAL RECEIVER AND OPTICAL TRANSMISSION SYSTEM

(75) Inventors: Takashi Sugihara, Tokyo (JP); Hirofumi Totsuka, Tokyo (JP); Takashi Mizuochi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 595 days.

(21) Appl. No.: 10/508,321

(22) PCT Filed: Apr. 23, 2003

(86) PCT No.: PCT/JP03/05206

§ 371 (c)(1),
(2), (4) Date: Sep. 20, 2004

(87) PCT Pub. No.: WO2004/095740

PCT Pub. Date: Nov. 4, 2004

(65) Prior Publication Data

US 2005/0105919 A1    May 19, 2005

(51) Int. Cl.
*H04B 10/06* (2006.01)
(52) U.S. Cl. .................. 398/202; 398/207; 398/210
(58) Field of Classification Search ................ 398/152, 398/154, 202–214
See application file for complete search history.

(56) References Cited

U.S. PATENT DOCUMENTS

| 5,661,585 | A | * | 8/1997 | Feldman et al. ............... 398/63 |
| 6,151,358 | A | | 11/2000 | Lee et al. |
| 6,519,375 | B1 | | 2/2003 | Rollins et al. |
| 6,538,786 | B1 | * | 3/2003 | Naito ......................... 398/152 |
| 2002/0044314 | A1 | * | 4/2002 | Michishita .................. 359/110 |
| 2002/0097470 | A1 | * | 7/2002 | Wedding et al. ............. 359/156 |

(Continued)

FOREIGN PATENT DOCUMENTS

EP    0 954 126 A1    11/1999

(Continued)

OTHER PUBLICATIONS

Bullow, et al. "Dispersion Mitigation Using a Fiber-Bragg-Grating Sideband Filter and a Tunable Electronic Equalizer"; Optical Fiber Communication Conference; Technical Digest Postconference Edition; Mar. 17-22, 2001; pp. WDD34-1 to WDD34-3.

(Continued)

*Primary Examiner*—Dzung D Tran
(74) *Attorney, Agent, or Firm*—Birch, Stewart, Kolasch & Birch, LLP

(57) ABSTRACT

The present invention includes an optical band-limiting filter which imposes a band-limitation on an input optical signal, an opto-electric converter which converts the optical signal output from the optical band-limiting filter into an electric signal, a lowpass filter which imposes the band-limitation on the electric signal output from the opto-electric converter, an amplifier which amplifies the output signal of the lowpass filter, and an electric equalizer which performs an equalization processing on a waveform of the electric signal output from the opto-electric converter are provided, and a full width at half maximum of the optical band-limiting filter is set to be equivalent to or smaller than a bit rate frequency of the optical signal.

20 Claims, 10 Drawing Sheets

U.S. PATENT DOCUMENTS

2002/0171900 A1 11/2002 Ono et al.
2003/0147646 A1* 8/2003 Zitelli ......................... 398/65

FOREIGN PATENT DOCUMENTS

| EP | 1 168 741 A2 | 1/2002 |
|----|--------------|--------|
| EP | 1 271 808 A2 | 1/2003 |
| EP | 1296471 A2 | 3/2003 |
| EP | 1 298 819 A2 | 4/2003 |
| JP | 6-104670 A | 4/1994 |
| JP | 8-163027 A | 6/1996 |
| JP | 9-233030 A | 9/1997 |
| JP | 11-72756 A | 3/1999 |
| JP | 11-331132 A | 11/1999 |
| JP | 2000-151516 A | 5/2000 |
| JP | 2000-292263 A | 10/2000 |
| JP | 2001-7765 A | 1/2001 |
| JP | 2001-308750 A | 11/2001 |
| WO | WO-02/15505 A2 | 2/2002 |

OTHER PUBLICATIONS

Lee et al., "Experimental 25-Mb/s wireless infrared link using 4-PPM with scalar decision-feedback equalization", Communications, 1998., IEEE International Conference, vol. 1, pp. 26-30, (Jun. 7, 1998). XP010284468.

Choudhary et al., "Influence of extinction ratio of clock modulator on dispersion tolerance fo carrier suppressed return to zero signals", LEOS 2001., 14th Annual Meeting of the IEEE Lasers & Electro-Optics Society, vol. 1 of 2, pp. 679-680, (Nov. 14, 2001). XP010566631.

G. Charlet et al., ECOC PD. 4.1, 2002.

D. F. Grosz et al., ECOC 2002 PD. 4.3.

* cited by examiner

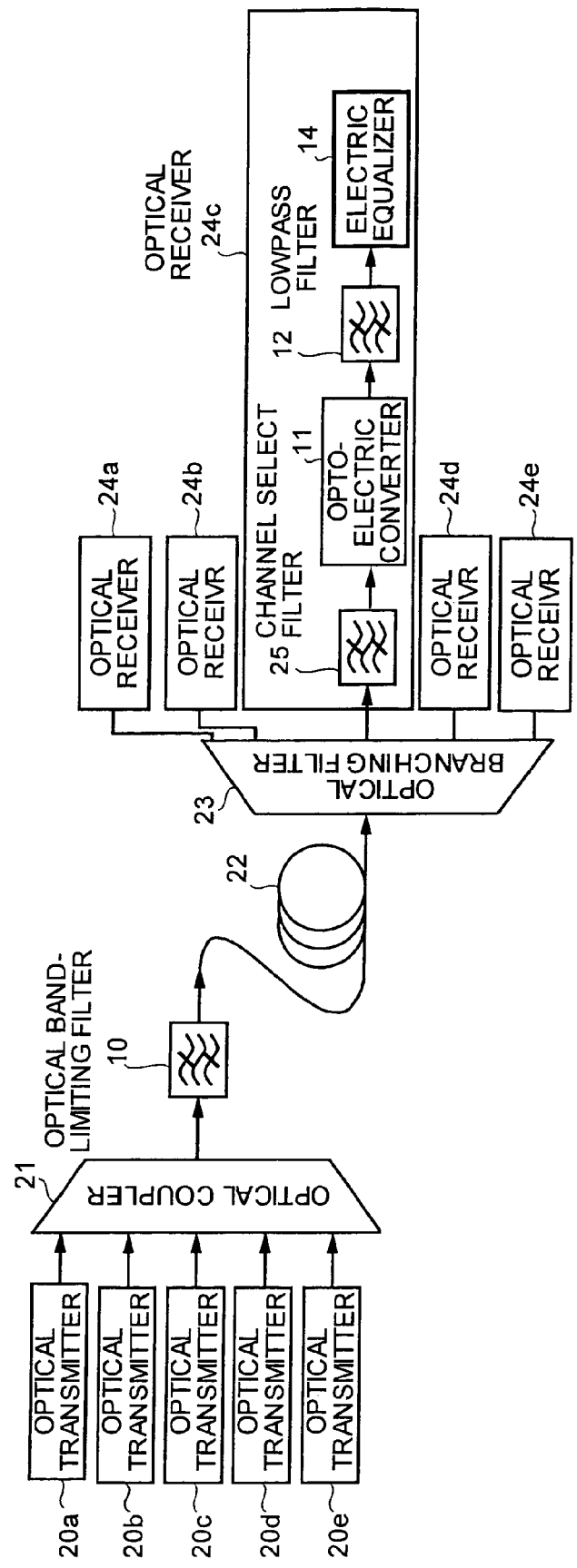

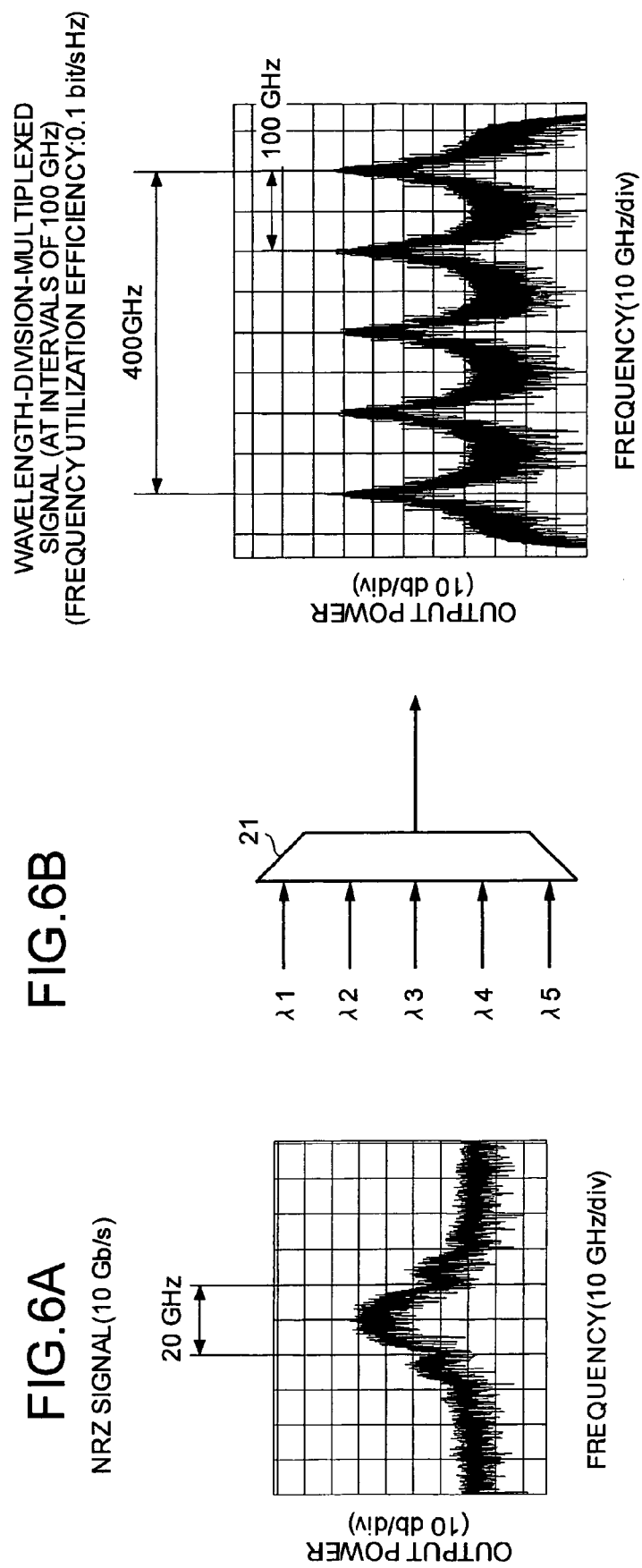

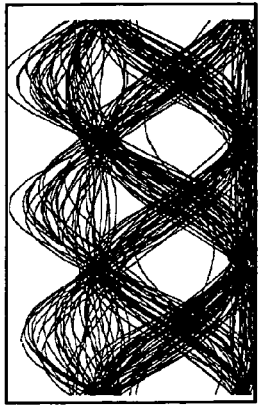

FIG.9A SPECTRUM OF TRANSMITTED OPTICAL SIGNAL (S1)

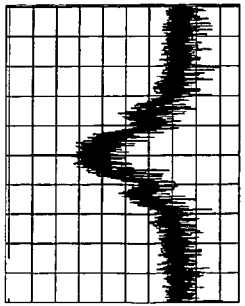

FIG.9B EYE PATTERN OF TRANSMITTED OPTICAL SIGNAL (S1)(10 Gb/s NRZ)

FIG.9C SPECTRUM OF WAVELENGTH-DIVISION-MULTIPLEXED SIGNAL (S2)(5ch × 10 Gb/s NRZ)

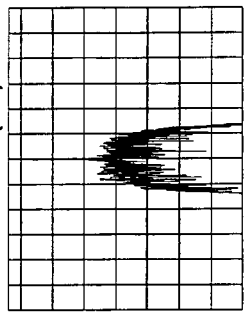

FIG.9D SPECTRUM OF RECEIVED OPTICAL SIGNAL (S3)

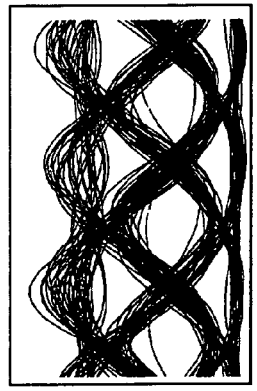

FIG.9E EYE PATTERN OF RECEIVED ELECTRIC SIGNAL (S4)

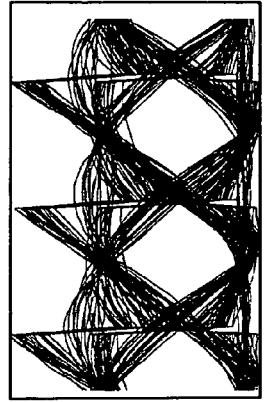

FIG.9F EYE PATTERN OF OUTPUT SIGNAL (S5) OF ELECTRIC EQUALIZER (FFE)

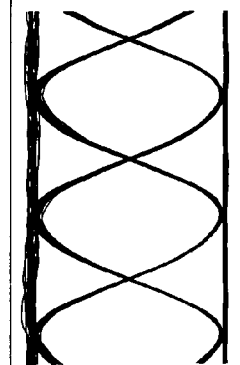

FIG.9G EYE PATTERN OF OUTPUT SIGNAL (S5) OF ELECTRIC EQUALIZER (FFE+DFE)

FFE

FFE+DFE

OPTICAL RECEIVER AND OPTICAL TRANSMISSION SYSTEM

TECHNICAL FIELD

The present invention relates to an optical receiver and an optical transmission system that includes an optical receiver. More specifically, the present invention relates to an optical receiver and an optical transmission system each of which holds high-quality, large-capacity, long-distance communications using an electric equalizer or the like.

BACKGROUND ART

An equalization technique for equalizing a waveform distortion using an electric circuit has been conventionally, actively utilized for high-quality data transmission in fields of wired communication using a metallic cable or the like and wireless communication.

However, since application of the technique to optical communication has been confronted by various disadvantages, it has just been made practical. Specifically, as examples of the application of the electric equalizer to the optical communication system proposed so far, examples of a configuration of a feed-forward equalizer (FFE) based on a transversal filter are disclosed in the Patent Literatures 1 and 2 (see below). In addition, an example of a configuration of a decision feedback equalizer (DFE) based on a transversal filter is disclosed in Patent Literature 3. Further, an example of a configuration of a Viterbi equalizer using maximum likelihood sequence estimation (MLSE) is disclosed in the Patent Literature 4 (see below).

Patent Literature 1: Japanese Patent Application Laid-open No. H8-163027
Patent Literature 2: Japanese Patent Application Laid-open No. 2000-299263
Patent Literature 3: Japanese Patent Application Laid-open No. 2001-308750
Patent Literature 4: Japanese Patent Application Laid-open No. 2001-7765

These application examples are characterized by easily performing small-sized and high-rate waveform shaping using an electric equalization filter that performs waveform equalization in an electric region without using an optical equalization filter that performs waveform equalization in an optical region. A distorted signal which has been subjected to an opto-electric conversion is decoded using the electric equalizing filter. By doing so, it is intended to ensure a high signal quality even in a transmission system which suffers waveform dispersion and polarization mode dispersion inherent in an optical transmission path.

Accordingly, each of these application examples is basically an extension of a utilization method of the electric equalizer in the wired communication and the wireless communication, and not a proposal of an optical communication system actively using the technique.

Meanwhile, with a view of improving the signal quality of the optical transmission system, if the electric equalization filter is used only for expecting an effect of improving a waveform of a received signal, only advantages such as a reduction in size and a reduction in cost of an apparatus are exhibited.

Only with the advantages, however, the obtained signal quality is as same as the signal quality obtained when an optical equalizing unit is employed. Therefore, these advantages do not essentially, greatly contribute to an improvement in function of the entire apparatus.

The present invention has been achieved in light of these circumstances, and has an object to obtain an optical communication system with an improved function using a waveform improving effect of an electric equalizer. Specifically, it is an object of the present invention to provide an optical receiver and an optical transmission system that uses this optical receiver capable of increasing a transmission rate and improving frequency utilization efficiency without degrading receiving characteristics.

DISCLOSURE OF THE INVENTION

An optical receiver according to an aspect of the present invention includes an optical band-limiting filter which imposes a band-limitation on an input optical signal; an opto-electric converter which converts the optical signal output from the optical band-limiting filter into an electric signal; and an electric equalizer which performs an equalization processing on a signal waveform of the electric signal output from the opto-electric converter, wherein a full width at half maximum of the optical band-limiting filter is equivalent to or smaller than a bit rate frequency of the optical signal.

According to the above aspect, the optical band-limiting filter is provided on an upstream side with respect to the opto-electric converter. The full width at half maximum of this optical band-limiting filter is set to be equivalent to or smaller than the bit rate frequency of the optical signal. The optical band-limiting filter imposes a band-limitation on the input optical signal. The opto-electric converter converts the optical signal output from the optical band-limiting filter into an electric signal, and the electric signal is input to the electric equalizer. The electric equalizer performs an equalization processing on a signal waveform of this electric signal. In a series of these processings, the optical band-limiting filter imposes the band-limitation on the signal in the optical region, so that the SNR can be improved. On the other hand, however, a waveform distortion and an inter-symbol interference occur. The waveform distortion and the inter-symbol interference can be eliminated by the equalization processing performed by the electric equalizer in the electric region.

BRIEF DESCRIPTION OF THE DRAWINGS

FIG. 5 is a block diagram which depicts a configuration of an optical transmission system according to a fourth embodiment of the present invention;

FIG. 6A is a waveform view for a frequency spectrum of a non-return-to-zero (NRZ) optical signal at 10 Gb/s;

FIG. 6B is a connection block diagram around an optical coupler when the NRZ optical signal is multiplexed;

FIG. 6C is a waveform view for a frequency spectrum of a WDM signal obtained by multiplexing five waves of the NRZ optical signal at 10 Gb/s at intervals of 100 gigahertz (Ghz);

FIGS. 9A to 9G depict frequency spectra or eye patterns of optical signals or electric signals at the respective observation points shown in FIG. 8;

BEST MODE FOR CARRYING OUT THE INVENTION

Exemplary embodiments of an optical receiver and an optical transmission system according to the present invention will be explained in detail with reference to the accompanying drawings.

First Embodiment

Figure 1:
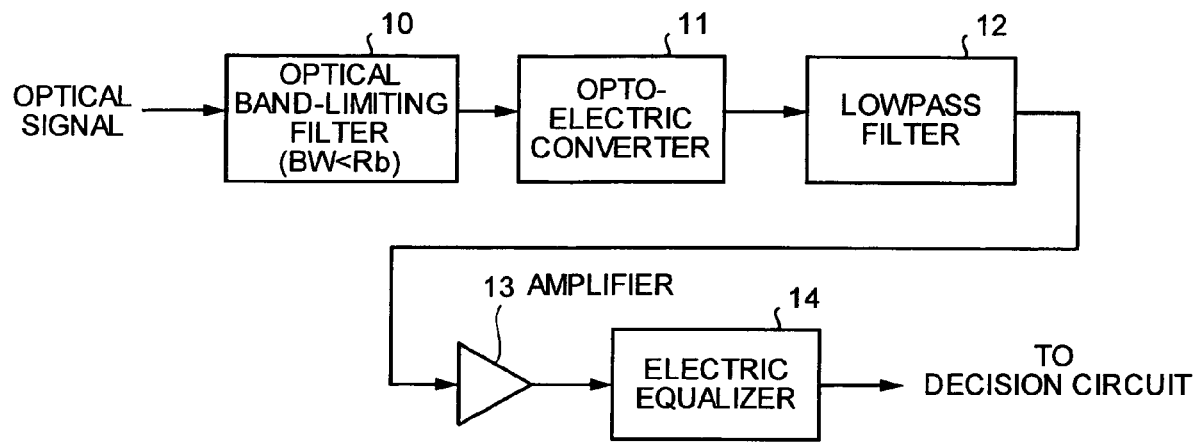
FIG. 1 is a block diagram which depicts a configuration of an optical receiver according to a first embodiment of the present invention.

FIG. 1 is a block diagram which depicts a configuration of an optical receiver according to a first embodiment of the present invention. The optical receiver shown in FIG. 1 includes an optical band-limiting filter 10 into which an optical signal is input, an opto-electric converter 11 which receives an output (the optical signal) of the optical band-limiting filter 10, a lowpass filter 12 which receives an output (an electric signal) of the opto-electric converter 11, an amplifier 13 which receives an output (the electric signal) of the lowpass filter 12, and an electric equalizer 14 which receives an output (the electric signal) of the amplifier 13.

An operation of the optical receiver will next be explained. In FIG. 1, the optical band-limiting filter 10 into which the transmitted optical signal is input imposes a band-limitation on a spectrum of the optical signal. The optical signal passed through the optical band-limiting filter 10 is converted into the electric signal by the opto-electric converter 11, and input to the lowpass filter 12. The lowpass filter 12 imposes a band-limitation on the electric signal converted by the opto-electric converter 12 in an electric region. The band-limited signal output from the lowpass filter 12 is input to the amplifier 13, subjected to a signal level adjustment by the amplifier 13, and output to the electric equalizer 14. The electric equalizer 14 performs a signal waveform equalization processing on the band-limited signal, the output level of which is adjusted by the amplifier 13, and outputs the resultant signal to a decision circuit which is not shown.

The equalization processing in the electric region performed by the electric equalizer 14 can effectively suppress an excessive inter-symbol interference that occurs due to the band-limitation imposed by the optical band-limiting filter 10. That is, the output from the electric equalizer 14 is, as a signal which can suppress inter-symbol interferences, made to a following decision circuit.

In order to effectively suppress the inter-symbol interference, the optical band-limiting filter 10 should effectively impose the band-limitation on the signal. As an index that represents filter characteristics of the optical band-limiting filter 10, a full width at half maximum (FWHM) defined by a wavelength difference between a shortest wavelength and a longest wavelength, at which a signal intensity in a certain wavelength region is half a maximum intensity is considered. It is assumed herein that the FWHM that represents the filter characteristics of the optical band-limiting filter 10 is "BW" and that a bit rate frequency of the optical signal is "Rb", it is preferable to select the BW so that the BW and the Rb satisfy a relationship of BW<Rb. Namely, the FWHM of the optical band-limiting filter 10 is preferably set to be equal to or smaller than a signal transmission rate.

As explained above, according to the optical receiver of the first embodiment, if a wavelength division multiplexing communication is to be held, only a desired wavelength is caused to selectively pass through the optical band-limiting filter having a sufficiently narrow band (e.g., equal to the bit rate frequency) while a wavelength multiplicity is set high. It is thereby possible to construct the optical receiver having the high frequency utilization efficiency without deteriorating the receiving characteristics.

In the first embodiment, the optical receiver is constituted so that the optical band-limiting filter having the band-limiting function is arranged just on an upstream side with respect to the opto-electric converter. Depending on the configuration of an optical transmission system, this optical band-limiting filter can be arranged on a transmitting end.

Second Embodiment

Figure 2:
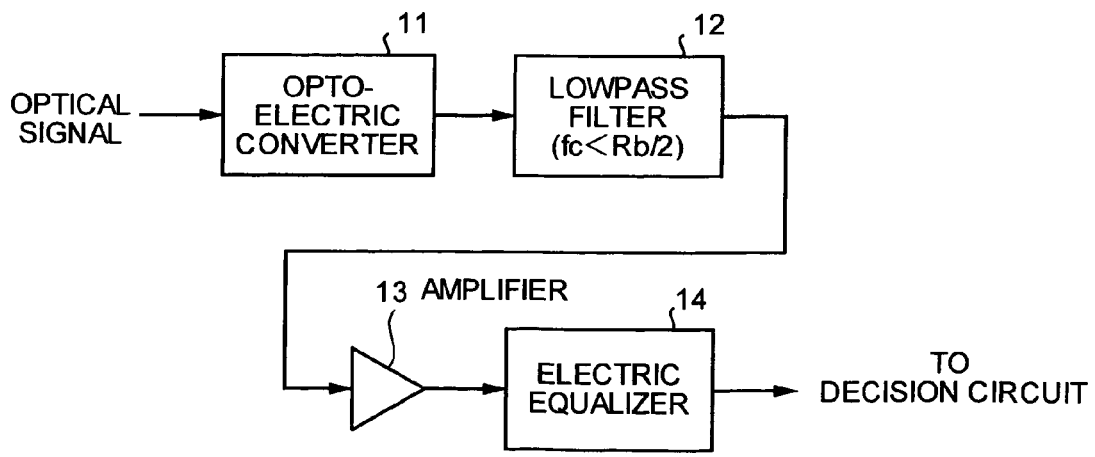
FIG. 2 is a block diagram which depicts a configuration of an optical receiver according to a second embodiment of the present invention.

FIG. 2 is a block diagram which depicts a configuration of an optical receiver according to a second embodiment of the present invention. The optical receiver shown in FIG. 2 is constituted so that the optical band-limiting filter is removed from the configuration shown in FIG. 1. The other constituent elements of the optical receiver shown in FIG. 2 are equal or equivalent to those of the optical receiver shown in FIG. 1. Like constituent elements as those according to the first embodiment are designated by like reference signs, respectively.

Figure 3A:
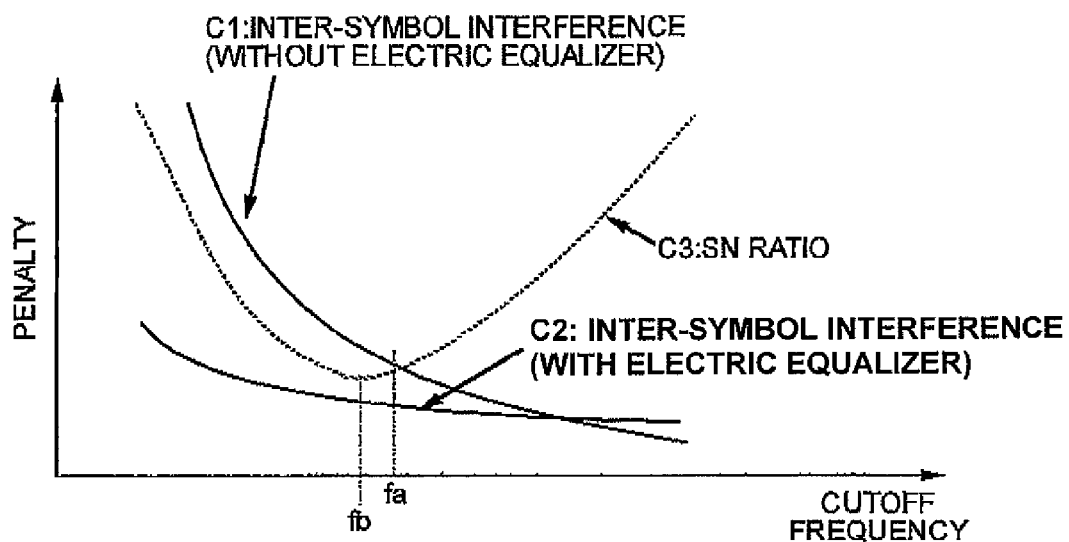
FIG. 3A is a graph of penalties when a cutoff frequency of a lowpass filter is changed from viewpoints of an inter-symbol interference and a signal-to-noise ratio (SNR), respectively.
Figure 3B:
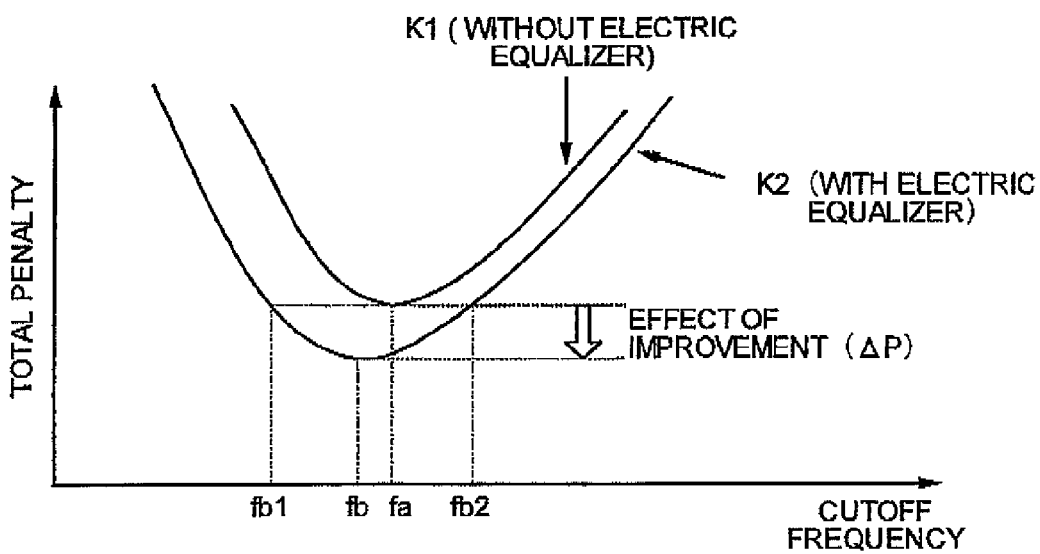
FIG. 3B is a graph of a relationship between the cutoff frequency of the lowpass filter and a total penalty of the inter-symbol interference and the SNR.

An operation of this optical receiver will next be explained with reference to FIGS. 2, 3A, and 3B. FIG. 3A is a graph of penalties when a cutoff frequency of the lowpass filter 12 is changed from viewpoints of the inter-symbol interference and a signal-to-noise ratio (SNR), respectively. FIG. 3B is a graph of a relationship between the cutoff frequency of the lowpass filter 12 and a total penalty of the inter-symbol interference and the SNR.

With reference to FIG. 2, the transmitted input signal is input to the opto-electric converter 11, converted into an electric signal by the opto-electric converter 11, and input to the lowpass filter 12. The lowpass filter 12 imposes a band-limitation on the electric signal converted by the opto-electric converter 11 in the electric region. A band-limited signal output from the lowpass filter 12 is input to the amplifier 13, subjected to a signal component level adjustment by the amplifier 13, and output to the electric equalizer 14. The electric equalizer 14 performs a signal waveform equalization processing on the band-limited signal, the output level of which is adjusted by the amplifier 13, and outputs the resultant signal to a decision circuit which is not shown.

In the first embodiment, the FWHM of the optical band-limiting filter 10 is set at an appropriate value so as to effectively suppress the degradation of the signal quality due to the inter-symbol interference. On the other hand, in the second embodiment, the cutoff frequency of the lowpass filter 12 needs to be set at an appropriate value in light of a signal quality degradation dependent on the SNR of the received optical signal and a signal quality degradation resulting from the inter-symbol interference that occurs due to the band-limitation imposed by the lowpass filter 12.

In FIG. 3A, curves C1 and C2 are graphs that show relationship between the cutoff frequency (fc) and the penalties from the viewpoints of the inter-symbol interference, respectively. The curve C1 corresponds to an example in which the electric equalizer 14 is not provided. The curve C2 corresponds to an example in which the electric equalizer 14 is provided. The both curves indicate that the penalties increase when the cutoff frequency is reduced. However, as shown in the curve C1, if the electric equalizer 14 is not provided, the penalty has a rapid increase according to a reduction in the cutoff frequency.

The curve C3 is a graph of the relationship between the cutoff frequency (fc) and the penalty from the viewpoints of the SNR of the received optical signal, irrespective of the presence of the electric equalizer. Differently from the characteristics of the curves C1 and C2, a cutoff frequency (fb) which makes the penalty optimum is present.

FIG. 3B is a graph of the relationships between the cutoff frequency (fc) and the penalty from the viewpoints of the inter-symbol interference and the SNR, respectively. Namely, a curve K1 is a graph of the relationship between the cutoff frequency (fc) and the total penalty if the electric equalizer 14 is not provided. The curve K1 is a combination of the curves C1 and C3 shown in FIG. 3A. Likewise, a curve K2 is a graph of the relationship between the cutoff frequency (fc) and the total penalty if the electric equalizer 14 is provided. The curve K2 is a combination of the curves C2 and C3 shown in FIG. 3A.

As shown in FIG. 3A, if the cutoff frequency of the lowpass filter 12 is reduced to narrow a pass-bandwidth, the cutoff frequency that makes the total penalty optimum is present, irrespective of the presence of the electric equalizer 14.

Further, if the cutoff frequency of the lowpass filter 12 is reduced to be equal to or lower than this optimum frequency to thereby narrow the pass-bandwidth, the total penalty increases. This characteristic is such that the deterioration in the signal waveform of the band-limited optical signal is grater as the pass-bandwidth is narrower because of the effect of the inter-symbol interference resulting from the band-limitation.

In addition, the cutoff frequency for minimizing (optimizing) the total penalty if the electric equalizer 14 is provided differs from that if the electric equalizer 14 is not provided. Namely, the optimum cutoff frequency if the electric equalizer 14 is not provided is fa with which the curve K1 has a minimum. The optimum cutoff frequency if the electric equalizer 14 is provided is fb with which the curve K2 has a minimum.

This fb is preferably set so that the fb and the bit rate frequency Rb of the optical signal satisfy a relationship of $fb<(Rb/2)$. That is, the cutoff frequency of the lowpass filter 12 is preferably set equal or equivalent to a half the bit rate frequency.

Furthermore, as shown in FIG. 3B, if the electric equalizer 14 is provided, the effect of improving the total penalty by $\Delta P$ is produced. Conversely, by providing the electric equalizer 14, an allowed width of the set cutoff frequency of the lowpass filter 12 so as to set the total penalty at a desired total penalty widens. Namely, as shown in FIG. 3B, the cutoff frequency fb can be set at an arbitrary value between $fb_1$ and $fb_2$ ($fb_1<fb_2$), thereby increasing flexibility of setting of a parameter for the band-limitation.

As explained above, according to the optical receiver in the second embodiment, the degree of the signal quality degradation caused by the effect of the inter-symbol interference resulting from the band-limitation and the effect of the SNR is suppressed to a minimum in the determination of the electric band of the receiver. It is thereby possible to easily realize the supply of a high-quality signal to the decision circuit.

In the second embodiment, the optical receiver is constituted so that the lowpass filter having the electric band-limiting function is arranged on a receiving end. Depending on the configuration of the optical transmission system, the electric band-limiting filter having the electric band-limiting function can be provided on a transmitting end. If so, it goes without saying that an optimum electric band can be designed as total optical transmission characteristics.

Third Embodiment

Figure 4:
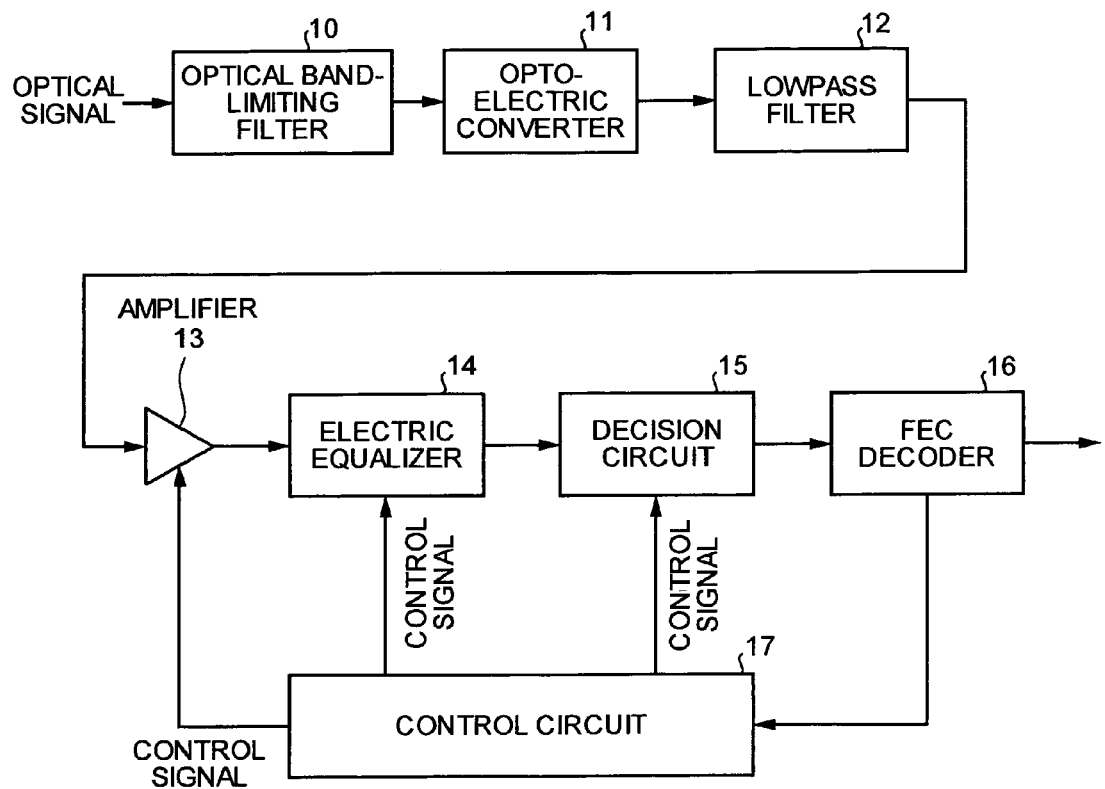
FIG. 4 is a block diagram which depicts a configuration of an optical receiver according to a third embodiment of the present invention.

FIG. 4 is a block diagram which depicts a configuration of an optical receiver according to a third embodiment of the present invention. The optical receiver shown in FIG. 4 includes a decision circuit 15 that receives the output (the electric signal) of an electric equalizer 14 and a forward error correction code (FEC) decoder 16 that receives an output (the electric signal) of the decision circuit 15 in addition to the constituent elements shown in FIG. 1. The optical receiver shown in FIG. 4 also includes a control circuit 17 connected to the amplifier 13, the electric equalizer 14, and the decision circuit 15 by control signal lines.

An operation of this optical receiver will next be explained with reference to FIG. 4. Since the operation performed until the band-limited signal, the output level of which is adjusted by the electric equalizer 14, is output is the same as that according to the first embodiment, it will not be explained herein.

With reference to FIG. 4, the signal output from the electric equalizer 14 is input to the decision circuit 15. The decision circuit 15 decides and reproduces the input signal, and outputs a reproduced frame signal to the FEC decoder 16. The FEC decoder 16 performs error detection and error correction on the input frame signal. At this time, transmission error information (e.g., the number of error corrections and alarm information) generated based on an error information detecting function and an error information correcting function inherent in the FEC decoder 16 is output to the control circuit 17. The control circuit 17 generates a control signal for correcting transmission error based on the transmission error information transmitted from the FEC decoder 16, and transmits the control signal to the amplifier 13, the electric equalizer 14, and the decision circuit 15.

To further facilitate controlling of the electric equalizer 14, it is necessary to easily estimate a parameter controlled by the electric equalizer 14. For example, by enabling estimation of an equalization parameter that uses a known data sequence, an operation amount and a circuit scale of the control circuit 17 can be reduced, as compared with an instance of performing a complete blind equalization.

In addition, by controlling the amplifier 13, an amplitude of the input electric signal input to the electric equalizer 14 can be appropriately adjusted according to a fluctuation in a state of a transmission path, and a stable operation of the electric equalizer 14 can be realized.

Furthermore, the signal waveform output from the electric equalizer 14 to the decision circuit 15 is normally an analog signal subjected to a finite band-limitation. Therefore, by always setting a discrimination threshold of the decision circuit 15 in an optimum state, the influence of an unintended waveform distortion generated in the electric equalizer 14 can be suppressed to a minimum.

In order to realize these functions, an excellent error-correction code is preferably used for the error information detection function and the information correcting function. For example, it is preferable to use a Reed-Solomon sequence (255, 239), a Bose-Chaudhuri-Hocquenenghem (BCH) sequence, or the like as the error-correction code.

If the error-correction code is used, a frame structure such as an optical transport network (OTN) transmission frame specified in ITU-T G. 709 is normally employed. A known bit sequence (e.g., a frame synchronization pulse) for the system can be buried particularly in an overhead of this OTN transmission frame as a known sequence of the error-correction code. By using the known bit sequence buried in this OTN transmission frame, the estimation of an optimum equalization parameter 14 allocated to the electric equalizer can be realized with a smaller circuit scale and a smaller operation amount.

Furthermore, with the use of the error-correction code, the number of error corrections can be detected. Consequently, in the control of a discrimination threshold of the decision circuit 15, the discrimination threshold can be set on the position where the detected number of errors is minimum, and an optical receiver with a higher performance can be achieved.

As explained above, according to the optical receiver in the third embodiment, the optical receiver that has an excellent performance can be obtained with a smaller circuit scale when constituting the optical receiver using the electric equalizing unit. The optical receiver using the electric equalizer can be constituted to have an excellent function and to be small in size.

Fourth Embodiment

FIG. 5 is a block diagram which depicts a configuration of an optical transmission system according to a fourth embodiment of the present invention. The optical transmission system in FIG. 5 applies the optical receiver shown in FIG. 1, as a receiver to process wavelength multiplexing signals of five waves.

The configuration shown in FIG. 5 is explained first. The optical transmission system shown in FIG. 5 includes, on a transmitting end, five optical transmitters 20a to 20e, an optical coupler 21 which couples outputs (optical signals) of these optical transmitters 20a to 20e, and an optical band-limiting filter 10 which receives an output of the optical coupler 21. An output of the optical band-limiting filter 10 here is coupled with an optical fiber 22 and transmitted to a receiving end.

On the receiving end, the optical transmission system includes an optical branching filter 23 which receives an output of the optical fiber 22 and fiver receivers 24a to 24e which receive optical signals branched by the optical branching filter 23, respectively. Since the five optical receivers 24a to 24e have the same configuration, an internal configuration of one of the receivers, i.e., the optical receiver 24c is shown in FIG. 5. That is, the receiver 24c includes a channel select filter 25 which selects one wavelength-division-multiplexed (WDM) signal, the opto-electric converter 11 which receives the output (optical signal) of the channel select filter 25, the lowpass filter 12 which receives the output (electric signal) of the opto-electric converter 11, and the electric equalizer 14 which receives the output (electric signal) of the lowpass filter 12.

For the sake of explanation, the amplifier 13 mentioned in the first to the third embodiments as well as the decision circuit 15, the FEC decoder 16, and the control circuit 17 mentioned in the third embodiment have been omitted from FIG. 5. In addition, as mentioned in the first and the second embodiments, the optical transmission system in the fourth embodiment has the optical band-limiting filter 10 arranged on the transmitting end.

An operation of this optical transmission system will next be explained with reference to FIG. 5. In FIG. 5, channel signals of the optical transmitters 20a to 20e are coupled with one another by the optical coupler 21, and the coupled WDM signal is output to the optical band-limiting filter 10. The optical band-limiting filter 10 imposes a band-limitation on this WDM signal. This optical band-limiting filter 10 is provided so as to collectively narrow a band of the WDM signal. As the filter 10, a filter (e.g., interleaver or arrayed waveguide grating (AWG)) having periodicity relative to a wavelength can be used, for example. If the optical coupler 21 is designed to include an optical pass-band so as to be able to perform both optical coupling and band-limitation, the optical coupler 21 can also function as the optical band-limiting filter 10.

On the receiving end, the WDM signal transmitted by the optical fiber 22 is branched by the optical branching filter 23 and input to the optical receiver 24c. The channel select filter 25 provided in the optical receiver 24c is inserted so as to remove noise in bands other than a desired optical signal band. If the optical branching filter 23 does not completely suppress adjacent channels or does not completely suppress amplified spontaneous emission (ASE) noise, the channel select filter 25 is inserted so as to suppress these unnecessary wave components. If the optical branching filter 23 has sufficient filtering characteristics, the channel select filter 25 can be omitted.

FIGS. 6A to 6C, and FIG. 7A to 7C are explanatory views which explain a state of a change in an optical spectrum if a multiplicity is increased in wavelength division multiplexing. Specifically, FIG. 6A is a waveform view for a frequency spectrum of a non-return-to-zero (NRZ) optical signal at 10 Gb/s. FIG. 6B is a connection block diagram around the optical coupler 21 if this NRZ optical signal is multiplexed. FIG. 6C is a waveform view for a frequency spectrum of a WDM signal obtained by multiplexing five waves of the NRZ optical signal at 10 Gb/s at intervals of 100 Ghz. A frequency utilization efficiency of the WDM signal shown in FIG. 6C is 0.1 (bit/s/Hz).

Figure 7C:
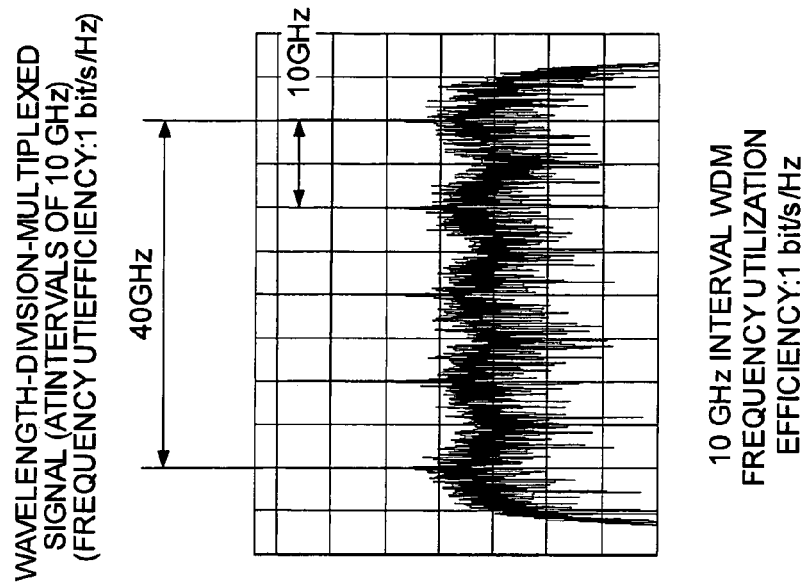
FIG. 7C is a waveform view for a frequency spectrum of a WDM signal obtained by multiplexing five waves of the NRZ optical signal at 10 Gb/s at intervals of 10 Ghz.
Figure 7B:
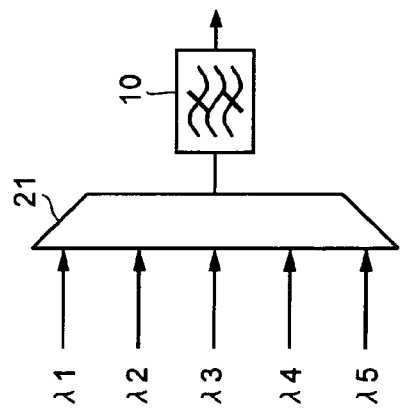
FIG. 7B is a connection block diagram around the optical coupler when the NRZ optical signal is multiplexed.
Figure 7A:
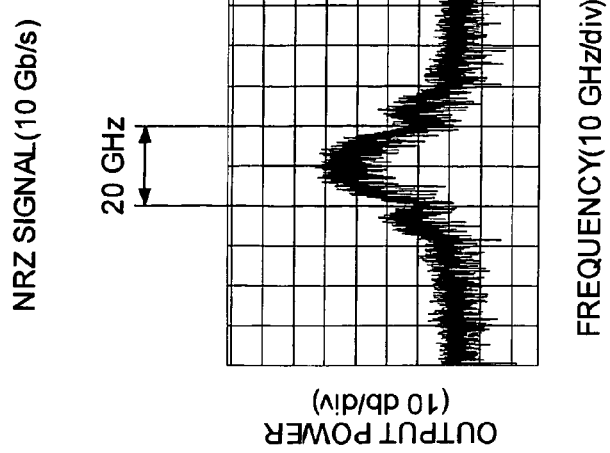
FIG. 7A is a waveform view for a frequency spectrum of the NRZ optical signal at 10 Gb/s.

Likewise, FIG. 7A is a waveform view for a frequency spectrum of a non-return-to-zero (NRZ) optical signal at 10 Gb/s. FIG. 7B is a connection block diagram around the optical coupler 21 if this NRZ optical signal is multiplexed. FIG. 7C is a waveform view for a frequency spectrum of a WDM signal obtained by multiplexing five waves of the NRZ optical signal at 10 Gb/s at intervals of 10 Ghz. A frequency utilization efficiency of the WDM signal shown in FIG. 7C is 1 bit/s/Hz, and set to be ten times as high as that of the WDM signal shown in FIG. 6C.

Normally, as shown in FIGS. 6A and 7A, the NRZ optical signal at 10 Gb/s has a bandwidth (an entire bandwidth) of the optical spectrum of 20 Ghz. Due to this, as shown in FIG. 6C, if the optical signal is multiplexed at sufficiently wide intervals, a penalty of a crosstalk between the channels hardly occurs.

However, as shown in FIG. 7C, if the optical signal is wavelength-multiplexed at intervals equal to the spectrum width of a single channel so as to increase the frequency utilization efficiency, the penalty of the crosstalk of the adjacent channels cannot be ignored. Therefore, it is necessary to provide the band-limiting filter 10 as shown in FIG. 7B, for example, and to multiplex each channel signal while limiting the optical spectrum width so as to sufficiently reduce the crosstalk between the adjacent channels.

Figure 8:
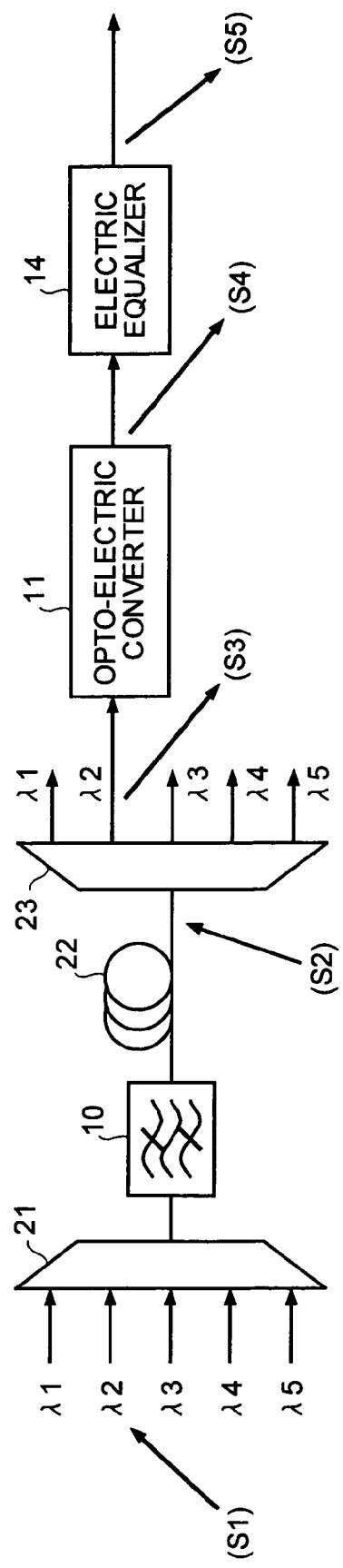
FIG. 8 depicts waveform observation points, at which the waveform of the transmitted WDM signal is observed, on the block diagram of the system.
Figure 10A:
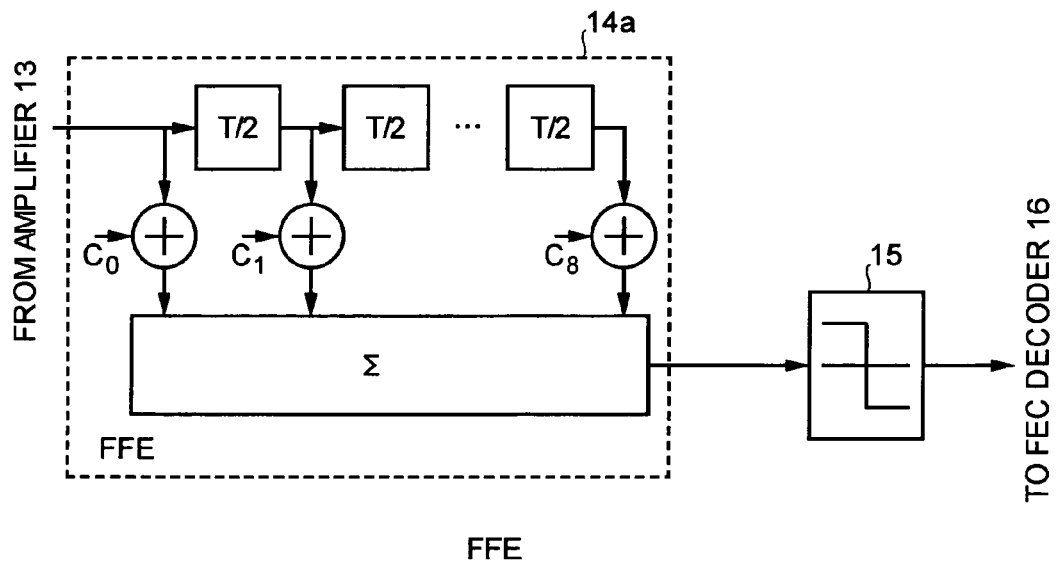
FIG. 10A is a block diagram which depicts one example of a configuration of the FFE.
Figure 10B:
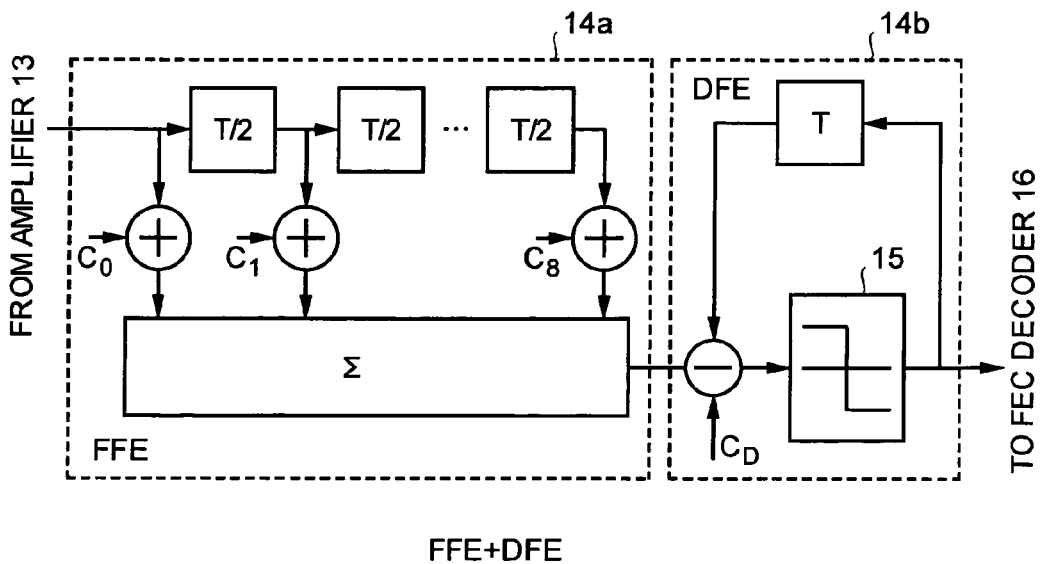
FIG. 10B is a block diagram which depicts one example of a configuration of a combination of the FFE and the DFE.

FIG. 8 depicts waveform observation points, at which the waveform of the transmitted WDM signal is observed, on the block diagram of the system. FIGS. 9A to 9G depict frequency spectra or eye patterns of optical signals or electric signals at the respective observation points shown in FIG. 8. FIGS. 10A and 10B are block diagrams which depicts detailed configuration examples of the electric equalizer 14.

The waveforms shown in FIGS. 9A to 9G will be explained specifically. FIG. 9A is a waveform view for a frequency spectrum of an NRZ signal (S1) on a transmission channel 1. In the fourth embodiment, the NRZ optical signal (S1) equal to the NRZ optical signal at 10 Gb/s shown in FIGS. 6A and 7A is used. FIG. 9B is a waveform view for the eye pattern of the NRZ optical signal (S1) shown in FIG. 9A. FIG. 9C is a waveform view for a frequency spectrum of an NRZ signal (S2). In the fourth embodiment, the NRZ optical signal (S2) obtained by limiting the bandwidth of the NRZ optical signal at 10 Gb/s to a filter pass-width of 10 Ghz, and multiplexing five waves of the signal at intervals of 10 Ghz is used.

FIG. 9D is a waveform view for a frequency spectrum of an optical signal (S3) on a reception channel 1 just before the signal is input to the opto-electric converter 11. FIG. 9E is a waveform view for an eye pattern of an electric signal (S4) on the reception channel 1 just before the signal is input to the electric equalizer 14. FIG. 9F is a waveform view for an eye pattern of an output signal (S5) which has been passed through the electric equalizer if the FFE is employed as the electric equalizer 14. FIG. 9G is a waveform view for an eye pattern of the output signal (S5) which has been passed through the electric equalizer if the DFE is employed as the electric equalizer 14.

The waveforms shown in FIGS. 10A and 10B will be explained specifically. FIG. 10A is a block diagram which depicts one example of a configuration of the FFE. FIG. 10B is a block diagram which depicts one example of a configuration of a combination of the FFE and the DFE.

The electric equalizer can be constituted as an FFE 14a shown in FIG. 10A by combining delay circuits, addition circuits, and the like. Likewise, the electric equalizer that is the combination of the FFE and the DFE can be constituted so that an output of the FFE 14a is received and processed by a DFE 14b as shown in FIG. 10B. The DFE 14b, the block diagram of which is shown in FIG. 10B, is constituted to include a decision circuit, which is normally arranged right in rear of the electric equalizer.

Referring back to FIGS. 9A to 9G, when attention is brought to the waveforms of FIGS. 9A to 9F, the following aspects are clarified. With reference to the eye pattern shown in FIG. 9E, an eye opening is reduced. This evidently shows that the receive signal is degraded. The reason of the degradation is as follows. As a result of imposing the band-limitation on the optical signal stage so as to improve the wavelength multiplicity (or frequency utilization efficiency), beat noise resulting from the crosstalk between the adjacent channels is reduced. However, the influence of the inter-symbol interference due to the band-limitation is increased.

The waveform of the optical signal just before the signal is passed through the electric equalizing unit as shown in FIG. 9E will be compared with the waveforms of the optical signal after the signal is passed through the electric equalizing unit as shown in FIGS. 9F and 9G, respectively. The comparisons evidently show that the deterioration of the eye opening before the optical signal is passed through the electric equalizing unit is improved after the optical signal is passed through the electric equalizing unit. This means that, even if the inter-symbol interference is increased due to excessive band-limitation, the influence of the inter-symbol interference can be lessened as long as the electric equalizer 14 used as the electric signal waveform equalizing unit has a sufficient ability. In addition, these results indicate that, even if the wavelength multiplicity is increased so as to improve the frequency utilization efficiency, the degradation of the signal quality resulting from the band-limitation can be suppressed by using the electric equalizer 14 as well as the optical signal band-limitation.

Figure 11:
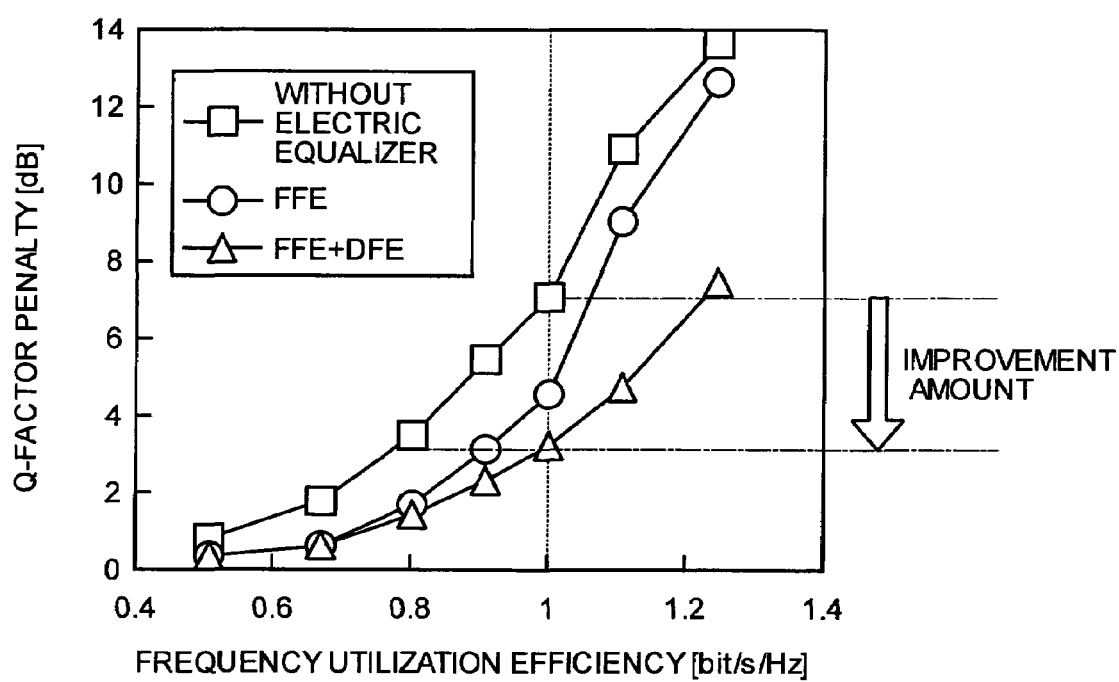
FIG. 11 is a graph of a relationship between frequency utilization efficiency and Q-factor penalty, depending on the presence of the electric equalizer 14.

FIG. 11 is a graph which depicts a relationship between frequency utilization efficiency and Q-factor penalty, depending on the presence of the electric equalizer 14. The graph shown in FIG. 11 is one example of a result of a calculation performed to quantitatively evaluate the effect of the electric equalizer 14 in the configuration of FIG. 8. In this calculation, it is assumed that a signal bit rate is 10 Gb/s, the pass-band (FWHM) of the band-limiting filter is equivalent to the wavelength-multiplexing interval (e.g., the filter pass-band is 10 Ghz when the signal is multiplexed at intervals of 10 Ghz), and the SNR of the optical signal is 20 decibels (with a resolution of 0.1 nanometer). In addition, a Q-factor penalty is used as an index for estimating a degree of improvement.

In FIG. 11, a curve plotted with squares represents characteristics if the electric equalizer is not provided, and that plotted with circles represents characteristics if the FFE 14a shown in FIG. 10A is employed as the electric equalizer, and that plotted with triangles represents characteristics if the FFE 14a and the DFE 14b shown in FIG. 10B are employed as the electric equalizer.

The calculation results shown in FIG. 11 clarify the following aspects. Attention is now brought to a vertical-axis direction (the Q-factor penalty). A signal quality improvement of about three decibels is obtained for the frequency utilization efficiency of, for example, 1 bit/s/Hz (of the optical signal wavelength-multiplexed at intervals of 10 Ghz) by the use of the electric equalizer. Attention is then brought to a horizontal-axis direction (the frequency utilization efficiency). The frequency utilization efficiency of 1 bit/s/Hz can be obtained while maintaining the signal quality with the utilization efficiency of 0.8 bit/z/Hz if the electric equalizer is not used. This means that the improvement of the frequency utilization efficiency can be easily realized by using both the electric equalizer and the band-limiting technique.

In this way, both the band-limiting technique and the electric equalizing unit are used, the optical spectrum is subjected to the band-limitation so as to be able to sufficiently suppress the crosstalk between the adjacent channels, and the effect of the inter-symbol interference generated by the excessive band-limitation is suppressed by the electric equalizing unit. It is thereby possible to realize more efficient wavelength-division-multiplexing transmission for a finite transmission band. It is, therefore, possible to easily increase a transmission capacity.

In the fourth embodiment, the optical transmission system relating to the WDM signal having five wavelengths modulated at 10 Gb/s has been explained. However, the bit rate frequency, the number of multiplexed wavelengths, the wavelength-division-multiplexing interval, and the like are not limited to those in the fourth embodiment. Further, the effect of the equalizer has been evaluated, taking the two types of electric equalizers shown in FIGS. 10A and 10B as examples.

However, applicable electric equalizers are not limited to those shown in FIGS. 10A and 10B.

As explained so far, according to the optical receiver of the present invention, a full width at half maximum of the optical band-limiting filter which imposes the band-limitation on the input optical signal is set equivalent to or smaller than the bit rate frequency of the optical signal. Therefore, the SNR of the received signal can be improved. On the other hand, the waveform distortion and the inter-symbol interference generated by the optical band-limitation are eliminated by the equalization processing using the electric equalizer. Therefore, the optical receiver with high frequency utilization efficiency can be advantageously, easily constructed.

According to the optical receiver of the next invention, a parameter of the electric equalizer is estimated based on a known sequence of an error-correction code buried in an overhead of a transmission frame. Therefore, the optimum equalization parameter of the electric equalizer can be estimated at high rate, and the circuit scale can be reduced. Therefore, a small-sized, high-performance optical receiver can be advantageously obtained.

According to the optical receiver of the next invention, a parameter of the electric equalizer is estimated based on a frame synchronization pulse buried in an overhead of a transmission frame. Therefore, the optimum equalization parameter of the electric equalizer can be estimated at high rate, and the circuit scale can be reduced. Therefore, a small-sized, high-performance optical receiver can be advantageously obtained.

According to the optical receiver of the next invention, a discrimination threshold of the decision circuit is set based on the number of error corrections. Therefore, the performance of the optical receiver can be advantageously improved.

According to the optical receiver of the next invention, amplitude of the input signal input to the electric equalizer is appropriately adjusted in accordance with a fluctuation in a state of a transmission path. Therefore, even with a fluctuation in the optical waveform following the fluctuation in the state of the transmission path, the optical receiver can stably operate, advantageously.

According to the optical receiver of the next invention, a cutoff frequency of the lowpass filter is set equal to or lower than a half of a bit rate frequency of the optical signal. Therefore, it is advantageously possible to impose the band-limitation on the signal so that the SNR on the receiving end is optimum, and easily improve the quality of the received signal.

According to the optical receiver of the next invention, the cutoff frequency of the lowpass filter is set so that a total penalty that compensates for the signal quality degradation dependent on a signal-to-noise ratio and a signal quality degradation resulting from an inter-symbol interference is smaller. Therefore, it is advantageously possible to impose the band-limitation on the signal so that the SNR on the receiving end is optimum, and easily improve the quality of the received signal.

According to the optical receiver of the next invention, a parameter of the electric equalizer is estimated based on a known sequence of an error-correction code buried in an overhead of a transmission frame. Therefore, the optimum equalization parameter of the electric equalizer can be estimated at high rate, and the circuit scale can be reduced. Therefore, a small-sized, high-performance optical receiver can be advantageously obtained.

According to the optical receiver of the next invention, a parameter of the electric equalizer is estimated based on a frame synchronization pulse buried in an overhead of a transmission frame. Therefore, the optimum equalization parameter of the electric equalizer can be estimated at high rate, and the circuit scale can be reduced. Therefore, a small-sized, high-performance optical receiver can be advantageously obtained.

According to the optical receiver of the next invention, a discrimination threshold of the decision circuit is set based on the number of error corrections. Therefore, the performance of the optical receiver can be advantageously improved.

According to the optical receiver of the next invention, amplitude of the input signal input to the electric equalizer is appropriately adjusted in accordance with a fluctuation in a state of a transmission path. Therefore, even with a fluctuation in the optical waveform following the fluctuation in the state of the transmission path, the optical receiver can stably operate, advantageously.

According to the optical transmission system of the next invention, a full width at half maximum of the optical band-limiting filter which imposes the band-limitation on the input optical signal is set equivalent to or smaller than the bit rate frequency of the optical signal. Therefore, the SNR of the received signal can be improved. On the other hand, the waveform distortion and the inter-symbol interference generated by the optical band-limitation are eliminated by the equalization processing using the electric equalizer. Therefore, the optical transmission system with high frequency utilization efficiency can be advantageously, easily constructed.

According to the optical transmission system of the next invention, a parameter of the electric equalizer is estimated based on a known sequence of an error-correction code buried in an overhead of a transmission frame. Therefore, the optimum equalization parameter of the electric equalizer can be estimated at high rate, and the circuit scale can be reduced. Therefore, a small-sized, high-performance optical receiver can be advantageously obtained.

According to the optical transmission system of the next invention, a parameter of the electric equalizer is estimated based on a frame synchronization pulse buried in an overhead of a transmission frame. Therefore, the optimum equalization parameter of the electric equalizer can be estimated at high rate, and the circuit scale can be reduced. Therefore, a small-sized, high-performance optical receiver can be advantageously obtained.

According to the optical transmission system of the next invention, a discrimination threshold of the decision circuit is set based on the number of error corrections. Therefore, the performance of the optical receiver can be advantageously improved.

According to the optical transmission system of the next invention, amplitude of the input signal input to the electric equalizer is appropriately adjusted in accordance with a fluctuation in a state of a transmission path. Therefore, even with a fluctuation in the optical waveform following the fluctuation in the state of the transmission path, the optical receiver can advantageously, stably operate.

According to the optical transmission system of the next invention, a full width at half maximum of the optical band-limiting filter which imposes the band-limitation on the input optical signal is set equivalent to or smaller than the bit rate frequency of the optical signal, and a cutoff frequency of the lowpass filter is set equal to or lower than a half of a bit rate frequency of the optical signal. Accordingly, the band-limitation on the signal, by which the SNR on the receiving end is optimum, is imposed in both the optical region and the electric region, and the waveform distortion and the inter-symbol interference generated by the optical band-limitation are eliminated by the equalization processing using the electric equalizer. Therefore, it is advantageously possible to easily improve the quality of the received signal, and to easily construct the optical transmission system with high frequency utilization efficiency.

According to the optical transmission system of the next invention, the cutoff frequency of the lowpass filter is set so that a total penalty that compensates for a signal quality degradation dependent on a signal-to-noise ratio and a signal quality degradation resulting from an inter-symbol interference is smaller. Therefore, it is advantageously possible to impose the band-limitation on the signal so that the SNR on the receiving end is optimum, and easily improve the quality of the received signal.

According to the optical transmission system of the next invention, a parameter of the electric equalizer is estimated based on a frame synchronization pulse buried in an overhead of a transmission frame. Therefore, the optimum equalization parameter of the electric equalizer can be estimated at high rate, and the circuit scale can be reduced. Therefore, a small-sized, high-performance optical receiver can be advantageously obtained.

According to the optical transmission system of the next invention, a discrimination threshold of the decision circuit is set based on the number of error corrections. Therefore, the performance of the optical receiver can be advantageously improved.

INDUSTRIAL APPLICABILITY

As explained so far, the optical receiver and the optical transmission system according to the present invention are suited for improving the ability of the optical transmission system such as the acceleration of the transmission rate and the improvement of the frequency utilization efficiency.

The invention claimed is:

1. An optical receiver comprising:
an optical band-limiting filter which imposes a band-limitation on an input optical signal;
an opto-electric converter which converts the optical signal output from the optical band-limiting filter into an electric signal; a lowpass filter which imposes a band limitation on the electric signal output from the opto-electric converter;
an amplifier which performs a signal level adjustment on the electric signal received from the lowpass filter; and
an electric equalizer which performs an equalization processing on a signal waveform of the electric signal output from the amplifier, wherein
a full width at half maximum of the optical band-limiting filter is equivalent to or smaller than a bit rate frequency of the optical signal.

2. The optical receiver according to claim 1, further comprising:
a decision circuit which decides and reproduces an output signal output from the electric equalizer;
an FEC decoder which performs error detection and error correction on a frame signal output from the decision circuit, and which detects the number of error corrections of the frame signal; and
a control circuit to which the number of error corrections is transmitted, wherein
the control circuit estimates a parameter of the electric equalizer based on a known sequence of an error-correction code buried in an overhead of a transmission frame.

3. The optical receiver according to claim 1, wherein
the control circuit estimates a parameter of the electric equalizer based on a frame synchronization pulse buried in an overhead of a transmission frame.

4. The optical receiver according to claim 1, further comprising:
a decision circuit which decides and reproduces an output signal output from the electric equalizer;
an FEC decoder which performs error detection and error correction on a frame signal output from the decision circuit, and which detects the number of error corrections of the frame signal; and
a control circuit to which the number of error corrections is transmitted, wherein
the control circuit sets a discrimination threshold of the decision circuit based on the number of error corrections.

5. The optical receiver according to claim 1, further comprising:
an amplifier which amplifies an output signal output to the electric equalizer;
a decision circuit which decides and reproduces an output signal output from the electric equalizer;
an FEC decoder which performs error detection and error correction on a frame signal output from the decision circuit, and which detects the number of error corrections of the frame signal; and
a control circuit to which the number of error corrections is transmitted, wherein
the control circuit controls the amplifier to appropriately adjust an amplitude of the input signal input to the electric equalizer in accordance with a fluctuation in a state of a transmission path.

6. An optical receiver comprising:
an opto-electric converter which converts an input optical signal into an electric signal;
a lowpass filter which imposes a band-limitation on the electric signal output from the opto-electric converter;
an amplifier which performs a signal level adjustment on the electric signal received from the lowpass filter; and
an electric equalizer which performs an equalization processing on a signal waveform of the electric signal output from the amplifier, wherein
a cutoff frequency of the lowpass filter is equal to or lower than a half of a bit rate frequency of the optical signal.

7. The optical receiver according to claim 6, wherein
the cutoff frequency of the lowpass filter is set so that a total penalty that compensates for a signal quality degradation dependent on a signal-to-noise ratio and a signal quality degradation resulting from an inter-symbol interference is smaller.

8. The optical receiver according to claim 6, further comprising:
a decision circuit which decides and reproduces an output signal output from the electric equalizer;
an FEC decoder which performs error detection and error correction on a frame signal output from the decision circuit, and which detects the number of error corrections of the frame signal; and
a control circuit to which the number of error corrections is transmitted, wherein
the control circuit estimates a parameter of the electric equalizer based on a known sequence of an error-correction code buried in an overhead of a transmission frame.

9. The optical receiver according to claim 6, further comprising:
a decision circuit which decides and reproduces an output signal output from the electric equalizer;
an FEC decoder which performs error detection and error correction on a frame signal output from the decision circuit, and which detects the number of error corrections of the frame signal; and
a control circuit to which the number of error corrections is transmitted, wherein
the control circuit estimates a parameter of the electric equalizer based on a frame synchronization pulse buried in an overhead of a transmission frame.

10. The optical receiver according to claim 6, further comprising:
a decision circuit which decides and reproduces an output signal output from the electric equalizer;
an FEC decoder which performs error detection and error correction on a frame signal output from the decision circuit, and which detects the number of error corrections of the frame signal; and
a control circuit to which the number of error corrections is transmitted, wherein
the control circuit sets a discrimination threshold of the decision circuit based on the number of error corrections.

11. The optical receiver according to claim 6, further comprising:
an amplifier which amplifies an output signal output to the electric equalizer;
a decision circuit which decides and reproduces an output signal output from the electric equalizer;
an FEC decoder which performs error detection and error correction on a frame signal output from the decision circuit, and which detects the number of error corrections of the frame signal; and
a control circuit to which the number of error corrections is transmitted, wherein
the control circuit controls the amplifier to appropriately adjust an amplitude of the input signal input to the electric equalizer in accordance with a fluctuation in a state of a transmission path.

12. An optical transmission system comprising an optical transmitter and an optical receiver, wherein
each of the optical transmitters includes an optical band-limiting filter which imposes a band-limitation on an optical signal, and
each of the optical receiver includes
an opto-electric converter which converts the optical signal transmitted from the optical transmitter into an electric signal;
a lowpass filter which imposes a band-limitation on the electric signal output from the opto-electric converter;
an amplifier which performs a signal level adjustment on the electric signal received from the lowpass filter; and
an electric equalizer which performs an equalization processing on a waveform of the electric signal output from the amplifier and wherein
a full width at half maximum of the optical band-limiting filter is equivalent to or smaller than a bit rate frequency of the optical signal.

13. The optical transmission system according to claim 12, wherein the optical receiver further includes
a decision circuit which decides and reproduces an output signal output from the electric equalizer;
an FEC decoder which performs error detection and error correction on a frame signal output from the decision circuit, and which detects the number of error corrections of the frame signal; and
a control circuit to which the number of error corrections is transmitted, wherein
the control circuit estimates a parameter of the electric equalizer based on a known sequence of an error-correction code buried in an overhead of a transmission frame.

14. The optical transmission system according to claim 12, wherein the optical receiver further includes
a decision circuit which decides and reproduces an output signal output from the electric equalizer;
an FEC decoder which performs error detection and error correction on a frame signal output from the decision circuit, and which detects the number of error corrections of the frame signal; and
a control circuit to which the number of error corrections is transmitted, wherein
the control circuit estimates a parameter of the electric equalizer based on a frame synchronization pulse buried in an overhead of a transmission frame.

15. The optical transmission system according to claim 12, wherein the optical receiver further includes
a decision circuit which decides and reproduces an output signal output from the electric equalizer;
an FEC decoder which performs error detection and error correction on a frame signal output from The decision circuit and which detects the number of error corrections of The frame signal; and
a control circuit to which the number of error corrections is transmitted, wherein the control circuit sets a discrimination threshold of the decision circuit based on The number of error corrections.

16. The optical transmission system according to claim 12, wherein The optical receiver further includes
an amplifier which amplifies an output signal output to The electric equalizer;
a decision circuit which decides and reproduces an output signal output from the electric equalizer;
an FEC decoder which performs error detection and error correction on a frame signal output from the decision circuit, and which detects the number of error corrections of the frame signal; and
a control circuit to which The number of error corrections is transmitted, wherein
the control circuit controls The amplifier to appropriately adjust an amplitude of the input signal input to the electric equalizer in accordance with a fluctuation in a state of a transmission path.

17. The optical transmission system according to claim 12, wherein the optical receiver further includes
a lowpass filter which imposes the band-limitation on the electric signal output from the opto-electric converter, and
a cutoff frequency of the lowpass filter is equal to or lower than a half of a bit rate frequency of the optical signal.

18. The optical transmission system according to claim 17, wherein
the cutoff frequency of the lowpass filter is set so that a total penalty that compensates for a signal quality degradation dependent on a signal-to-noise ratio and a signal quality degradation resulting from an inter-symbol interference is smaller.

19. The optical transmission system according to claim 17, wherein the optical receiver further includes
- a decision circuit which decides and reproduces an output signal output from the electric equalizer;
- an FEC decoder which performs error detection and error correction on a frame signal output from the decision circuit, and which detects the number of error corrections of the frame signal; and
- a control circuit to which the number of error corrections is transmitted, wherein
- the control circuit estimates a parameter of the electric equalizer based on a frame synchronization pulse buried in an overhead of a transmission frame.

20. The optical transmission system according to claim 17, wherein the optical receiver further includes
- a decision circuit which decides and reproduces an output signal output from the electric equalizer;
- an FEC decoder which performs error detection and error correction on a frame signal output from the decision circuit, and which detects the number of error corrections of the frame signal; and
- a control circuit to which the number of error corrections is transmitted, wherein the control circuit sets a discrimination threshold of the decision circuit based on the number of error corrections.

* * * * *